United States Patent [19]
Schwertfeger et al.

[11] Patent Number: 6,140,377
[45] Date of Patent: *Oct. 31, 2000

[54] PROCESS FOR PREPARING ORGANICALLY MODIFIED AEROGELS USING ALCOHOLS

[75] Inventors: Fritz Schwertfeger, Frankfurt; Andreas Zimmermann, Griesheim, both of Germany

[73] Assignee: Hoechst Research & Technology Deutschland GmbH & Co. KG, Frankfurt, Germany

[*] Notice: This patent is subject to a terminal disclaimer.

[21] Appl. No.: 09/068,184

[22] PCT Filed: Nov. 5, 1996

[86] PCT No.: PCT/EP96/04821

§ 371 Date: Sep. 29, 1998

§ 102(e) Date: Sep. 29, 1998

[87] PCT Pub. No.: WO97/17287

PCT Pub. Date: May 15, 1997

[30] Foreign Application Priority Data

Nov. 6, 1995 [DE] Germany ............... 195 41 279

[51] Int. Cl.[7] ............... B01J 13/00; B05D 7/00; C01B 36/16
[52] U.S. Cl. ............... 516/100; 252/62; 423/338; 427/220; 501/12
[58] Field of Search ............... 516/100; 427/220; 501/12; 423/338

[56] References Cited

U.S. PATENT DOCUMENTS

| | | |
|---|---|---|
| 4,190,457 | 2/1980 | McDaniel ............... 423/338 X |
| 5,496,527 | 3/1996 | Yokogawa et al. ............... 423/338 |
| 5,565,142 | 10/1996 | Deshpande et al. ............... 516/100 X |
| 5,647,962 | 7/1997 | Jansen et al. ............... 423/338 X |
| 5,795,556 | 8/1998 | Jansen et al. ............... 423/338 |
| 5,888,425 | 3/1999 | Schwertfeger et al. ............... 427/220 |
| 5,911,658 | 6/1999 | Yoldas ............... 427/220 X |

FOREIGN PATENT DOCUMENTS

| | | |
|---|---|---|
| 0658513 A1 | 6/1995 | European Pat. Off. . |
| WO 95/06617 | 3/1995 | WIPO . |

OTHER PUBLICATIONS

Journal of Porous Materials, vol. 2 (1996), p. 315–324.

*Primary Examiner*—Richard D. Lovering
*Attorney, Agent, or Firm*—Frommer Lawrence & Haug LLP

[57] ABSTRACT

The invention relates to a process for the preparation of aerogels having hydrophobic surface groups, consisting of
a) taking a silicate-type lyogel,
b) optionally subjecting the lyogel taken in Step a) to a solvent exchange with another solvent,
c) surface-modifying the gel obtained in Step a) or b) with at least one $C_1$–$C_6$-alcohol, and
d) drying, under subcritical conditions, the surface-modified gel obtained in Step c).

13 Claims, No Drawings

PROCESS FOR PREPARING ORGANICALLY MODIFIED AEROGELS USING ALCOHOLS

This application is a 371 of PCT/EP96/04821 filed Nov. 5, 1996.

The invention relates to a process for the preparation of organically modified $SiO_2$ aerogels with the use of alcohols.

Aerogels, particularly those having porosities over 60% and densities below 0.6 g/cm$^3$ have an extremely low thermal conductivity and for this reason are used as thermal insulating materials, as described e.g. in EP-A-0 171 722.

Aerogels in the broader sense of the term, i.e. in the sense of a "gel with air as dispersing agent," are prepared by drying a suitable gel. Understood by the term "aerogel" in this sense are aerogels considered in the narrower sense, xerogels and cryogels. A dried gel is considered an aerogel in the narrower sense of the term when the liquid of the gel is removed at temperatures above the critical temperature and starting from pressures above the critical pressure. However, if the liquid of the gel is removed under subcritical conditions, e.g. with the formation of a liquid-vapor boundary phase, then the resulting gel is designated as a xerogel. It should be noted that the gels according to the invention are aerogels in the sense of gels with air as dispersing agent.

$SO_2$ aerogels can be prepared e.g. by acid hydrolysis of tetraethyl orthosilicate in ethanol. During the hydrolysis a gel is formed whose structure is determined, among other things, by the temperature, the pH and the duration of the gelation process. However, during the drying of the wet gels the gel structure generally collapses because the capillary forces resulting during drying are extremely great. Collapse of the gel can be prevented by carrying out the drying above the critical temperature and critical pressure of the solvent. Since in this range the liquid/gas phase boundary disappears, the capillary forces also vanish and the gel does not change during the drying process, i.e. no shrinking of the gel during the drying will occur, either. Methods of preparation based on this drying technology are disclosed e.g. in EP-A-0 396 076 or WO 92/03378. However, e.g. when ethanol is used, this technique requires a temperature of about 240° C. and pressures over 60 bar. Although the exchange of ethanol against $CO_2$ before drying does reduce the drying temperature to about 30° C., the pressure required is then over 70 bar.

An alternative to the above drying method is offered by a process of subcritical drying of $SiO_2$ gels, if, before drying, the latter are reacted with a chlorine-containing silylating agent. In that case the $SiO_2$ gel can be obtained e.g. by acid hydrolysis of tetraalkoxysilanes, preferably tetraethoxysilane (TEOS) in a suitable organic solvent, preferably ethanol, by means of water. In a further step, after exchange of the solvent against a suitable organic solvent, the resulting gel is reacted with a chlorine-containing silylating agent. Used as silylating agents, because of their reactivity, are preferably methylchlorosilanes ($Me_{4-n}SiCl_n$, with n=1 to 3). Thereupon the resulting $SiO_2$ gel whose surface has been modified by methylsilyl groups, can be dried in air from an organic solvent. In this way aerogels having densities of less than 0.4 g/cm$^3$ and porosities over 60% can be obtained.

WO 94/25149 gives a detailed description of the method of preparation based on this drying technique.

Furthermore, before drying, the above-described gels can be treated in the aqueous alcoholic solution with tetraalkoxysilanes, and then aged, in order to increase the strength of the gel network, as disclosed e.g. in WO 92/20623.

However, the tetraalkoxysilanes used as starting materials in the above-described process are extremely expensive.

Furthermore, during silylation with chlorine-containing silylating agents hydrogen chloride (HC1) and a plurality of side products associated therewith will necessarily form, which in some cases require a very expensive and cost-intensive purification of the silylated $SiO_2$ gels by repeated washing with a suitable organic solvent. The particularly corrosion-resistant installations required in this operation are also very expensive. The safety risks associated with the formation of very large amounts of HCl gas will additionally require a very involved technique, and is thus also very cost-intensive.

A first, not inconsiderable cost reduction can be achieved by using water glass as the starting material for the preparation of the $SiO_2$ gels. To this end, a silicic acid can be prepared from an aqueous water glass solution with the aid of an ion exchanger resin, which acid will polycondense to a $SiO_2$ gel upon the addition of a base. Then in a further step, after exchange of the aqueous medium against a suitable organic solvent, the resulting gel is reacted with a chlorine-containing silylating agent. Used as silylating agents, because of their reactivity, are again preferably methylchlorosilanes ($Me_{4-n}SiCl_n$ with n=1 to 3). The resulting $SO_2$ gel surface-modified with methylsilyl groups can then also be dried in air from an organic solvent. The method of preparation based on this technique is described e.g. in DE-A-43 42 548.

However the above-described problems of extremely high production costs associated with the use of chlorine-containing silylating agents are not solved by the use of water glass as starting material.

German Patent Application P 19502453.2 describes the use of a chlorine-free silylating agent. This method starts out from the silicate-type lyogel obtained with the above-described process by different methods, and reacted with a chlorine-free silylating agent. Preferably used in this case as silylating agents are methylisopropenoxysilanes ($Me_{4-n}Si(OC(CH_3)CH_2)$) with n=1 to 3). Thereupon, the thus resulting $SiO_2$ gel surfacemodified with methylsilyl groups can again be dried in air from an organic solvent.

Although the use of chlorine-free silylating agents will solve the problem of HCl formation, the chlorine-free silylating agents used also represent an extremely high cost factor.

WO 95/06617 discloses hydrophobic silicic acid aerogels obtainable by the reaction of a water glass solution with an acid at a pH of from 7.5 to 11, extensive freeing of the resulting silicic acid hydrogel from ionic components by washing with water or dilute aqueous solutions of inorganic bases,—with the pH of the hydrogel maintained in the range of 7.5 to 11—, displacement of aqueous phase contained in the hydrogel by an alcohol, and subsequent supercritical drying of the resulting alcogel.

In this process, suitable alcohols for the water exchange are $C_1$–$C_5$ alcohols, preferably $C_3$–$C_5$ alcohols, and isopropanol in particular.

It is known that when the above-mentioned alcohols are used under supercritical conditions (WO 95/06617), esterification of the alcohols with the surface OH groups of the lyogel will take place. As a result, alkoxy-modified aerogels, e.g. isopropoxy-modified aerogels are obtained, which have hydrophobic surface groups.

However, a disadvantageous aspect of the method of preparation disclosed in WO 95/06617 is that the drying requires supercritical conditions which, e.g. for isopropanol, are at a temperature in the range of 240 to 280° C. and at a pressure of about 55 to 90 bar.

Hence the object of the present invention was to provide a process for the preparation of aerogels having hydrophobic surface groups, a process which does not have any of the above-described problems known in the prior art. In particular, the process according to the invention should be economical and capable of being carried out in a technically simple manner.

This object was met by a process for the preparation of aerogels having hydrophobic surface groups, consisting of
a) taking a silicate-type lyogel,
b) optionally subjecting the lyogel taken in Step a) to a solvent exchange with another solvent,
c) surface-modifying the gel obtained in Step a) or b) with at least one $C_1$–$C_6$-alcohol, and
d) drying, under subcritical conditions, the surface-modified gel obtained in Step c).

Preferably used are $C_3$–$C_5$ alcohols, such as isopropanol, isobutanol, tert.-butanol, sec.-pentanol and tert.-pentanol. Isopropanol, isobutanol and tert.-butanol are especially preferred.

In this process the alcohol is generally used in an amount of from 1 to 100% by weight, calculated on the total amount of solvent. Mixtures of the aforementioned alcohols can also be used.

In a preferred embodiment the lyogel taken in Step a) is a silicate-type lyogel obtainable by hydrolysis and condensation of Si-alkoxides in an organic solvent with water (i). Used as Si-alkoxide is a tetraalkoxysilane, preferably tetraethoxy or tetramethoxysilane. The organic solvent is preferably an alcohol, and by particular preference ethanol or methanol, to which up to 20% by volume of water may be added.

During the hydrolysis and condensation of the Si-alkoxides in an organic solvent with water, acids and/or bases may be added as catalysts in a one- or two-stage step.

In a particularly preferred embodiment the lyogel taken in Step a) is a silicate-type lyogel which is prepared by bringing the pH of an aqueous water glass solution to $\leq 3$ by means of an acid ion exchanger resin or an inorganic acid, then polycondensing the resulting silicic acid by the addition of a base to form a $SiO_2$ gel, and, if an inorganic acid was used, washing the gel with water until it is free of electrolytes (ii). In this step, sodium and/or potassium water glass is generally used. Used as ion exchanger resin is preferably an acidic resin, above all those which contain sulfonic acid groups. If inorganic acids are used, hydrochloric acid and sulfuric acid are suitable, above all. Used as base is generally $NH_4OH$, $NaOH$, $KOH$, $Al(OH)_3$ and/or colloidal silica. If an inorganic acid was used, the $SiO_2$ gel produced by means of the base is washed with water until it is substantially free of electrolytes. In that case the washing is preferably carried until the run-off wash water has the same electric conductivity as demineralized water. Before washing, the gel is preferably aged, generally at 20° C. to 100° C., preferably at 40 to 100° C., and by particular preference at 80 to 100° C. and at a pH of 4 to 11, preferably 5 to 9, and especially 5 to 7. The duration of this operation is generally 1 second to 48 hours, preferably 1 second to 24 hours, and particularly 1 second to 5 hours.

The gel obtained in (i) or (ii) is washed with an organic solvent until the water content of the gel is $\leq 5\%$ by weight, preferably $\leq 2\%$ by weight, and by particular preference $\leq 1\%$ by weight. Used as solvent are generally aliphatic alcohols, ethers, esters or ketones, as well as aliphatic or aromatic hydrocarbons. Preferred solvents are $C_1$–$C_5$ alcohols, acetone, tetrahydrofuran, ethyl acetate, dioxane, n-hexane and toluene. Particularly preferred solvents are isopropanol, isobutanol, tert.-butanol and acetone. However, mixtures of the aforementioned solvents can also be used.

Furthermore, the water can first be washed out with water-miscible alcohol, and the latter can then be washed out with a hydrocarbon.

Step a) is generally carried out at a temperature between the freezing point of the solution and 70° C.

Furthermore, the lyogel prepared in Step a) can be produced from the above-described silicate-type starting compounds, which additionally contain zirconium, aluminum and/or titanium compounds capable of condensation.

Used as organic solvents in Step b) are generally aliphatic alcohols, ethers, esters or ketones, as well as aliphatic or aromatic hydrocarbons. Mixtures of the aforementioned solvents can also be used. Preferred solvents are $C_1$–$C_5$ alcohols, acetone, tetrahydrofuran, ethyl acetate, dioxane, n-hexane, nheptane and toluene. Isopropanol is particularly preferred as a solvent in Step b). Understood by the term "solvent exchange" in this case is not only a one-time exchange of the solvent, but optionally also a multiple repetition with different solvents.

The lyogel obtained in Step b) can also be subjected to a further aging process. This is generally done between 20° C. and the boiling point of the organic solvent. Optionally, the aging may also be carried out under pressure at elevated temperatures. The duration is generally 1 second to 48 hours, and preferably 1 second to 24 hours. Such an aging can optionally be followed by a further solvent exchange with the same or different solvent. This additional aging step may optionally be repeated once again.

In Step c) the gel obtained in Step a) or b) is surface-modified with at least one $C_1$–$C_6$ alcohol in such a way that it is kept in a pressure vessel or autoclave under pressure and elevated temperature.

Used as alcohols are preferably isopropanol, isobutanol, tert.-butanol, sec.-pentanol and tert.-pentanol. Isopropanol, isobutanol or tert.-butanol are particularly preferred. These solvents can be used alone, in mixtures or with other nonreactive organic solvents or solvent mixtures, such as acetone, tetrahydrofuran, dioxane, n-hexane or toluene.

The temperatures and pressures for the surface modification depend on the respective solvent or solvent mixture used. However they are clearly below the critical temperature and critical pressure of the alcohols used.

A temperature between 25° C. and 220° C., and by particular preference between 150° C. and 220° C. is used.

The pressure is preferably between 1 and 50 bar, and by particular preference between 20 and 50 bar.

The times during which the lyogel is maintained under these conditions are preferably between 30 minutes and 20 hours, and by particular preference between 30 minutes and 10 hours.

Small amounts of a silylating agent may be optionally be added. Suitable as silylating agents are generally silanes of formulas $R^1_{4-n}SiCl_n$ or $R_{14-n}Si(OR^2)_n$ (with n=1 to 3), where $R^1$ and $R^2$, independently of one another, are $C_1$–$C_6$-alkyl, cyclohexyl or phenyl. Isopropenoxysilanes and silazanes are also suitable. Trimethylchlorosilane is preferably used. Furthermore, all silylating agents known to persons skilled in the art may be employed, e.g. even those disclosed in DE-A-44 30 669.

The quantities are generally between 0 and 1% by weight (calculated on the lyogel); the concentrations are preferably between 0 and 0.5% by weight, and by particular preference between 0 and 0.2% by weight.

To speed up the surface-modifying process, water may additionally be present in the system In that case concentrations between 0 and 10% by weight (calculated on the lyogel) are preferred. Moreover, to speed up the process, catalysts known to persons skilled in the art, such as acids, bases or organometallic compounds, may also be present in the system.

Optionally, the surface-modified gel obtained in Step c) may be subjected to another solvent exchange before Step d). Solvents generally used for this purpose are aliphatic alcohols, ethers, esters or ketones, as well as aliphatic or aromatic hydrocarbons. Mixtures of the aforementioned solvents may also be used. Preferred solvents are methanol, ethanol, isopropanol, acetone, tetrahydrofuran, ethyl acetate, dioxane, n-hexane, n-heptane and toluene. Particularly preferred, as solvent, is isopropanol.

In Step d), the surface-modified gel is dried under subcritical conditions, preferably at temperatures of from $-30°$ C. to $200°$ C., and by particular preference between 0 to $100°$ C., as well as at pressures between 0.001 to 20 bar, particularly between 0.01 and 5 bar, and by particular preference between 0.1 and 2 bar, for example by irradiation, convection and/or contact drying. The drying is generally carried out until the gel has a residual solvent content of less than 0.1% by weight. The aerogels obtained after drying are permanently hydrophobic.

In another embodiment the gel, depending on its use, may be subjected before surface modification to an additional network reinforcement. This is done by reacting the resulting gel with a solution of an alkyl and/or aryl orthosilicate capable of condensation and having the formula $R^1_{4-n}Si(OR^2)_n$, where n=2 to 4, and $R^1$ and $R^2$, independently of one another, are linear or branched $C_1$–$C_6$-alkyl groups, cyclohexyl groups or phenyl groups, or with an aqueous silicic acid solution. This network reinforcement can be carried out before and/or after every aging step or solvent exchange.

In another preferred embodiment the gel has, before drying, an E-modulus of more than 3 MPa, a BET surface area of more than 400 $m^2/g$ and a pore radius distribution in the range of from 2 to 20 nm, preferably in the range of from 5 to 10 nm, so that the aerogels obtained after the subcritical drying preferably have a density of $\leq 200$ $kg/m^3$, and by particular preference a density of $\leq 150$ $kg/m^3$.

Below, the process according to the invention is described in greater detail by means of an embodiment, without thereby limiting said process in any way.

EXAMPLE 1

2 L of a sodium water glass solution ($SiO_2$ content 6% by weight and $Na_2O:SiO_2$ ratio of 1:3.3) is run through a jacketed glass column (length 100 cm, diameter 8 cm) filled with 1 L of an acid ion exchanger resin (styrene-divinylbenzene copolymer containing sulfonic acid groups, and commercially available under the name Duolite® C 20) (about 70 mL/min). The column is operated at a temperature of $5°$ C. The silicic acid solution discharging at the lower end of the column has a pH of 2.3. For polycondensation, this solution is brought to a pH of 4.7 by means of a 1.0 molar NaOH solution, and then aged for 3.0 hours at $85°$ C. The modulus of elasticity of the aged hydrogel is 15.5 MPa. It is extracted with isopropanol until the water content of the gel is below 2.0% by weight. The isopropanol-containing lyogel is then heated in isopropanol in an autoclave to $220°$ C. and a pressure of 40 bar, and maintained under these conditions for 3 hours. The gel is dried in air (3 hours at $40°$ C., then 2 hours at $50°$ C. and 12 hours at $150°$ C.). The resulting transparent aerogel has a density of 0.15 $g/cm^3$. Its specific surface area according to BET is 500 $m^2/g$. The $\lambda$ value is 0.018 W/mK.

The thermal conductivity was measured by a hot wire method (see e.g. O. Nielsson, G. Rüischenpöhler, J. Gross and J. Fricke, High Temperatures—High Pressures, Vol. 21, 267–274 (1989)).

What is claimed is:

1. Process for the preparation of aerogels having hydrophobic surface groups, consisting of:
    a. taking a silicate-type lyogel,
    b. optionally subjecting the lyogel taken in Step a) to a solvent exchange with another solvent,
    c. subcritically surface-modifying the gel obtained in Step a) or b) with at least one $C_1$–$C_6$-alcohol at a temperature in the range of $25°$ C. to $220°$ C. and a pressure of from 1 to 50 bar, and
    d. drying, under subcritical conditions, the surface-modified gel obtained in Step c).

2. Process according to claim 1, characterized by using at least one $C_3$–$C_5$ alcohol in Step c).

3. Process according to claim 1, characterized by using isopropanol, isobutanol or tert-butanol in Step c).

4. Process according to claim 1, characterized in that the alcohol is used in an amount of from 1 to 100% by weight calculated on the total amount of solvent.

5. Process according to claim 1, characterized by taking a silicate-type lyogel obtainable by hydrolysis and condensation of Si-alkoxides in an organic solvent with water, and then washing the resulting gel with an organic solvent until the water content of the gel is $\leq 5\%$ by weight.

6. Process according to claim 1, characterized by taking a silicate-type lyogel prepared by bringing the pH of an aqueous water glass solution to $\leq 3$ by means of an acid ion exchanger resin or an inorganic acid, polycondensing the resulting silicic acid by the addition of a base to form a $SiO_2$ gel, and if an inorganic acid was used, washing the gel with water until it is free of electrolytes, and then washing the resulting gel with an organic solvent until the water content of the gel is $\leq 5\%$ by weight.

7. A process according to claim 1, characterized in that the solvent used in Step b) is a $C_1$–$C_6$ alcohol, acetone, tetrahydrofuran, ethyl acetate, dioxane, n-hexane, n-heptane and/or toluene.

8. Process according to claim 1, characterized in that the surface modification is carried out over a period between 30 minutes and 20 hours.

9. Process according to claim 1, characterized in that the surface modification is carried out in the presence of small amounts of a silylating agent.

10. Process according to claim 1, characterized in that the surface modification is carried out in the presence of a catalyst.

11. A process for the preparation of an aerogel having hydrophobic surface groups, consisting of
    a. taking a silicate-type lyogel, obtainable by hydrolysis and condensation of Si-alkoxides in an organic solvent with water;
    b. subjecting the lyogel taken in Step a) to a solvent exchange with another solvent;
    c. aging the lyogel taken in Step b) at 20 to $100°$ C. and a pH of 4 to 11 for a period of from 1 second to 48 hours;
    d. subcritically surface-modifying the gel obtained in Step c) with at least one $C_1$–$C_6$ alcohol at a temperature in the range of 25 to $220°$ C. and a pressure of from 1 to 50 bar; and
    e. drying, under subcritical conditions, the surface-modified gel obtained in step d).

12. A process for the preparation of an aerogel having hydrophobic surface groups, consisting of
    a. taking a silicate-type lyogel;
    b. optionally subjecting the lyogel taken in Step a) to a solvent exchange with another solvent;
    c. reacting the gel obtained in Step a) or b) with a solution of an alkyl and/or aryl orthosilicate capable of condensation and having the formula $R^1_{4-n}Si(OR^2)_n$ wherein n=2 to 4 and $R^1$ and $R^2$, independently of one another, are linear or branched $C_1$–$C_6$-alkyl groups, cyclohexyl groups or phenyl groups, or with an aqueous silicic acid solution;

d. subcritically surface-modifying the gel obtained in Step c) with at least one $C_1$–$C_6$ alcohol at a temperature in the range of 25 to 220° C. and a pressure of from 1 to 50 bar; and e. drying, under subcritical conditions, the surface-modified gel obtained in step d).

13. A process for the preparation of an aerogel having hydrophobic surface groups, consisting of a. taking a silicate-type lyogel;

b. optionally subjecting the lyogel taken in Step a) to a solvent exchange with another solvent;

c. subcritically surface-modifying the gel obtained in Step a) or b) with at least one $C_1$–$C_6$ alcohol at a temperature in the range of 25 to 220° C. and a pressure of from 1 to 50 bar;

d. subjecting the surface modified gel of Step c) to a solvent exchange; and e. drying, under subcritical conditions, the gel obtained in step d).

* * * * *